US008673209B2

(12) United States Patent
Bray et al.

(10) Patent No.: US 8,673,209 B2
(45) Date of Patent: Mar. 18, 2014

(54) ALUMINUM ALLOY PRODUCTS HAVING IMPROVED PROPERTY COMBINATIONS AND METHOD FOR ARTIFICIALLY AGING SAME

(75) Inventors: Gary H. Bray, Murrysville, PA (US); Dhurba J. Chakrabarti, Export, PA (US); Diana Denzer, Lower Burrell, PA (US); Jen Lin, Export, PA (US); John Newman, Export, PA (US); Greg Venema, Bettendorf, IA (US); Cagatay Yanar, Bethel Park, PA (US)

(73) Assignee: Alcoa Inc., Pittsburgh, PA (US)

( * ) Notice: Subject to any disclaimer, the term of this patent is extended or adjusted under 35 U.S.C. 154(b) by 453 days.

(21) Appl. No.: 11/748,021

(22) Filed: May 14, 2007

(65) Prior Publication Data

US 2008/0283163 A1   Nov. 20, 2008

(51) Int. Cl.
*C22F 1/053* (2006.01)
*C22C 21/10* (2006.01)

(52) U.S. Cl.
USPC ........... 420/532; 148/439; 148/701; 148/417; 148/690

(58) Field of Classification Search
USPC ................ 148/690, 417, 439, 701; 420/532
See application file for complete search history.

(56) References Cited

U.S. PATENT DOCUMENTS

| | | | |
|---|---|---|---|
| 3,135,633 A | 6/1964 | Hornus | 148/695 |
| 3,305,410 A | 2/1967 | Sublett et al. | 148/159 |
| 3,542,606 A | 11/1970 | Westerman et al. | 148/694 |
| 3,645,804 A | 2/1972 | Ponchel | 148/502 |
| 3,836,405 A | 9/1974 | Staley et al. | 148/502 |
| 3,856,584 A | 12/1974 | Cina | 148/701 |

(Continued)

FOREIGN PATENT DOCUMENTS

| | | |
|---|---|---|
| EP | 677779 | 2/1999 |
| EP | 377779 | 9/2001 |

(Continued)

OTHER PUBLICATIONS

*Aluminum and Aluminum Alloys*, ASM International, pp. 23-24, 124, (1993).

(Continued)

*Primary Examiner* — Rebecca Lee
(74) *Attorney, Agent, or Firm* — Greenberg Traurig, LLP (57) ABSTRACT

Aluminum alloy products about 4 inches thick or less that possesses the ability to achieve, when solution heat treated, quenched, and artificially aged, and in parts made from the products, an improved combination of strength, fracture toughness and corrosion resistance, the alloy consisting essentially of: about 6.8 to about 8.5 wt. % Zn, about 1.5 to about 2.00 wt. % Mg, about 1.75 to about 2.3 wt. % Cu; about 0.05 to about 0.3 wt. % Zr, less than about 0.1 wt. % Mn, less than about 0.05 wt. % Cr, the balance Al, incidental elements and impurities and a method for making same. The invention alloy is useful in making structural members for commercial airplanes including, but not limited to, upper wing skins and stringers, spar caps, spar webs and ribs of either built-up or integral construction. The invention alloy may be aged by 2 or 3 step practices while exceeding the SCC requirements for applications for which the invention alloy is primarily intended. The flexibility of the invention in this regard is useful for its application in multi-alloy or multi-material systems joined by welding or bonding and subsequently aged.

7 Claims, 6 Drawing Sheets

(56) References Cited

U.S. PATENT DOCUMENTS

| | | | |
|---|---|---|---|
| 3,881,966 A | 5/1975 | Staley et al. | 148/502 |
| 3,945,860 A | 3/1976 | Winter et al. | 148/502 |
| 3,947,297 A | 3/1976 | Reimann et al. | 148/695 |
| 4,189,334 A | 2/1980 | Dubost et al. | 148/502 |
| 4,200,476 A | 4/1980 | Dubost et al. | 148/502 |
| 4,294,625 A | 10/1981 | Hyatt et al. | 148/550 |
| 4,323,399 A | 4/1982 | Dubost et al. | 148/695 |
| 4,345,951 A | 8/1982 | Coupry et al. | 148/550 |
| 4,431,467 A | 2/1984 | Staley et al. | 148/701 |
| 4,477,292 A | 10/1984 | Brown | 148/502 |
| 4,488,913 A | 12/1984 | Ferton | 148/502 |
| 4,618,382 A | 10/1986 | Miyagi et al. | 148/415 |
| 4,648,913 A | 3/1987 | Hunt et al. | 148/693 |
| 4,747,890 A | 5/1988 | Meyer | 148/439 |
| 4,797,165 A | 1/1989 | Bretz et al. | 148/695 |
| 4,816,087 A | 3/1989 | Cho | 148/692 |
| 4,828,631 A | 5/1989 | Ponchel et al. | 148/417 |
| 4,832,758 A | 5/1989 | Brown | 148/695 |
| 4,863,528 A | 9/1989 | Brown et al. | 148/695 |
| 4,946,517 A | 8/1990 | Cho | 148/693 |
| 4,954,188 A | 9/1990 | Ponchel et al. | 148/694 |
| 4,961,792 A | 10/1990 | Rioja et al. | 148/552 |
| 4,988,394 A | 1/1991 | Cho | 148/693 |
| 5,047,092 A | 9/1991 | Faure | 148/439 |
| 5,066,342 A | 11/1991 | Rioja et al. | 148/693 |
| 5,108,520 A | 4/1992 | Liu et al. | 148/701 |
| 5,110,372 A | 5/1992 | Faure | 148/552 |
| RE34,008 E | 7/1992 | Quist et al. | 148/417 |
| 5,151,136 A | 9/1992 | Witters et al. | 148/689 |
| 5,213,639 A | 5/1993 | Colvin et al. | 148/693 |
| 5,221,377 A | 6/1993 | Hunt et al. | 148/417 |
| 5,240,522 A | 8/1993 | Tanaka et al. | 148/693 |
| 5,277,719 A | 1/1994 | Kuhlman et al. | 148/694 |
| 5,413,650 A | 5/1995 | Jarrett et al. | 148/690 |
| 5,496,426 A | 3/1996 | Murtha | 148/691 |
| 5,560,789 A | 10/1996 | Sainfort et al. | 148/549 |
| 5,759,302 A | 6/1998 | Nakai et al. | 148/415 |
| 5,865,911 A | 2/1999 | Miyasato et al. | 148/439 |
| 6,027,582 A | 2/2000 | Shahani et al. | 148/417 |
| 6,048,415 A | 4/2000 | Nakai et al. | 148/417 |
| 6,342,111 B1 | 1/2002 | Meki et al. | 148/417 |
| 6,595,467 B2 | 7/2003 | Schmidt | 244/119 |
| 6,790,407 B2 | 9/2004 | Fridlyander et al. | 420/532 |
| 6,972,110 B2 | 12/2005 | Chakrabarti et al. | 420/532 |
| 7,097,719 B2 | 8/2006 | Bray et al. | 148/417 |
| 7,214,281 B2 | 5/2007 | Gheorghe et al. | 148/550 |
| 2002/0150498 A1 | 10/2002 | Chakrabarti et al. | 420/532 |
| 2003/0116608 A1 | 6/2003 | Litwinski | 228/112.1 |
| 2004/0099352 A1 | 5/2004 | Gheorghe et al. | 148/550 |
| 2004/0136862 A1 | 7/2004 | Bray et al. | 420/532 |
| 2005/0011932 A1 | 1/2005 | Ehrstrom et al. | 228/112.1 |
| 2005/0034794 A1 | 2/2005 | Benedictus et al. | 148/552 |
| 2005/0058568 A1 | 3/2005 | Boselli et al. | 420/531 |
| 2005/0098245 A1 | 5/2005 | Venema et al. | 148/688 |
| 2005/0150578 A1 | 7/2005 | Bes et al. | 148/439 |
| 2005/0150579 A1 | 7/2005 | Chakrabarti et al. | 148/439 |
| 2005/0189044 A1 | 9/2005 | Benedictus et al. | 148/552 |
| 2005/0236075 A1 | 10/2005 | Gheorghe et al. | 148/550 |
| 2005/0269000 A1 | 12/2005 | Denzer et al. | 148/701 |
| 2006/0054666 A1 | 3/2006 | Ehrstrom et al. | 228/227 |
| 2006/0151075 A1 | 7/2006 | Van Der Veen et al. | 148/694 |
| 2006/0157172 A1 | 7/2006 | Fischer et al. | 148/690 |
| 2006/0174980 A1 | 8/2006 | Benedictus et al. | 148/552 |
| 2006/0182650 A1 | 8/2006 | Eberl et al. | 420/532 |
| 2006/0191609 A1 | 8/2006 | Dangerfield et al. | 148/552 |
| 2007/0029016 A1 | 2/2007 | Gheorghe et al. | 148/552 |
| 2007/0151636 A1 | 7/2007 | Buerger et al. | 148/552 |
| 2008/0173377 A1 | 7/2008 | Khosla et al. | 148/550 |
| 2008/0173378 A1 | 7/2008 | Khosla et al. | 148/550 |
| 2008/0299000 A1* | 12/2008 | Gheorghe et al. | 420/532 |
| 2009/0180920 A1 | 7/2009 | Reichlinger et al. | 420/532 |
| 2009/0320969 A1 | 12/2009 | Benedictus et al. | 148/552 |

FOREIGN PATENT DOCUMENTS

| | | |
|---|---|---|
| EP | 829552 | 7/2003 |
| EP | 1544315 | 6/2005 |
| EP | 1799391 | 3/2006 |
| FR | 2853666 | 10/2004 |
| FR | 2872172 | 12/2005 |
| JP | 58161747 | 9/1983 |
| JP | 58213852 | 12/1983 |
| JP | 5928555 | 2/1984 |
| JP | 2001335874 | 12/2001 |
| WO | WO2006086534 | 8/2006 |

OTHER PUBLICATIONS

*Metals Handbook: Desk Edition*, ASM International, 2$^{nd}$ ed., pp. 419-421, (1998).

*Aluminum Wrought Products*, Metals Handbook, 2$^{nd}$ ed., pp. 422, 445-460, (1998).

Hatch, J., *Aluminum: Properties and Physical Metallurgy*, American Society for Metals, pp. 367-368, (1984).

*International alloy designations and chemical composition limits for wrought aluminum and wrought aluminum alloys*, Registration Record Series, Aluminum Association, Washington, DC, US, XP002903949, pp. 1-26 (Jan. 1, 2004).

International Search Report from PCT/US2008/006253 (Dec. 16, 2008).

Islam et al., *Retrogression and Reaging Response of 7475 Aluminum Alloy*, Metals Technology, vol. 10, pp. 386-392, (Oct. 1983).

Rajan et al., *Microstructural Study of a High-Strength Stress-Corrosion Resistant 7075 Aluminum Alloy*, Journal of Materials Science, vol. 17, pp. 2817-2824 (1982).

Shahani, R. et al., *High Strength 7XXX Alloys for Ultra-Thick Aerospace Plate: Optimisation of Alloy Composition*, Aluminum Alloys, vol. 2, pp. 1105-1110 (Jul. 5-10, 1998).

Tumanov, A.T., *Use of Aluminum Alloys*, Moscow, Metalurgia Publishers, pp. 131-133, 139, (1973).

Tumanov, A.T., *Application of Aluminum Alloy*, Moscow, Metalurgia Publishers, pp. 181, (1973).

Wallace, W., *A New Approach to the Problem of Stress Corrsion Cracking in 7075-T6 Aluminum*, Canadian Aeronautics & Space Journal, vol. 27, No. 3, pp. 222-232 (1981).

Warner, T.J. et al. *Aluminum Alloy Developments for Affordable Airframe Structures*, Third ASM International Paris Conference on Synthesis, Processing and Modeling of Advanced Materials, pp. 79-88, (1997).

Dorward, R. C., *Enchanced Corrosion Resistance in Al—Zn—Mg—Cu Alloys*, Extraction, Refining and Fabrication of Light Metals, p. 383, Pergamon Press, 1990.

Fridlyander, J. N., *Development and Application of High Strength Al—Zn—Mg—Cu Alloys*, Aluminum Alloys: Their Physical and Mechanical Properties—Proceedings ICAA5, Materials Science Forum, vol. 217-222, pp. 1813-1818, 1996.

Fridlyander, J., *Advanced Russian Alloys*, Aluminum Alloys: Their Physical and Mechanical Properties—Proceedings ICAA4. vol. II, pp. 80-87, 1994.

Teleshov, V. V. et al., *Influence of Chemical Composition on High and Low Cycle Fatigue with Zero-Start Extension of Sheets of D16 and V95 Alloys*, Russian Metallurgica, pp. 141-144, 1983.

Office Action, mailed Dec. 3, 2010, from related U.S. Appl. No. 12/152,635.

Office Action dated Apr. 8, 2011, from related co-owned Russian Patent Application No. 2009146037/20(065676), with English translation.

* cited by examiner

ALUMINUM ALLOY PRODUCTS HAVING IMPROVED PROPERTY COMBINATIONS AND METHOD FOR ARTIFICIALLY AGING SAME

BACKGROUND OF THE INVENTION

1. Field of the Invention

The present invention relates to aluminum alloys, particularly 7000 Series (or 7XXX) aluminum ("Al") alloys as designated by the Aluminum Association. More particularly to aluminum alloy products useful in making structural members for commercial airplanes that are at most four inches in thickness.

2. Description of the Related Art

The industry demands on aluminum alloys have become more and more rigorous with each new series of aircraft manufactured by the aerospace industry. As the size of new jet aircraft get larger, or as current jetliner models grow to accommodate heavier payloads and/or longer flight ranges to improve performance and economy, the demand for weight savings in structural components such as wing components continues to increase.

Figure 1:
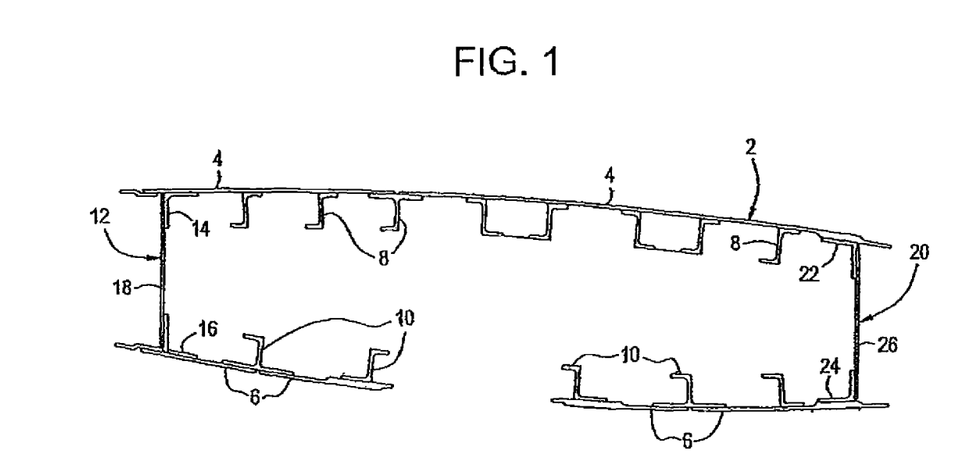
FIG. 1 is a transverse cross-sectional view of a typical wing box construction of an aircraft wing.

A traditional aircraft wing structure is shown in FIG. 1 and includes a wing box generally designated by numeral 2. Wing box 2 extends outwardly from the fuselage as the main strength component of the wing and runs generally perpendicular to the plane of FIG. 1. In wing box 2, upper and lower wing skins 4 and 6 are spaced by vertical structural members or spars 12 and 20 extending between or bridging upper and lower wing skins. Wing box 2 also includes ribs which extend generally from one spar to the other. These ribs lie parallel to the plane of FIG. 1 whereas the wing skins and spars run perpendicular to the FIG. 1 plane.

The upper wing cover is typically comprised of a skin 4 and stiffening elements or stringers 8. These stiffening elements can be attached separately by fastening or made integral with the skin to eliminate the need for separate stringers and rivets. During flight, the upper wing structure of a commercial aircraft wing is compressively loaded, calling for alloys with high compressive strength. This requirement has led to the development of alloys with increasingly higher compressive strength while still maintaining a nominal level of fracture toughness. The upper wing structural members of today's large aircraft are typically made from high strength 7XXX series aluminum alloys such as 7150 (U.S. Reissue Pat. No. 34,008), 7449 (U.S. Pat. No. 5,560,789) or 7055 aluminum (U.S. Pat. No. 5,221,377). More recently, U.S. Pat. No. 7,097,719 discloses an improved 7055 aluminum alloy.

However, the development of ultra-high capacity aircraft has led to new design requirements. Due to a larger and heavier wing and high aircraft gross takeoff weights, these aircraft experience high down-bending loads during landing producing high tensile loads in the upper wing structural members. While the tensile strength in the current upper wing alloys is more than adequate to withstand these down-bending loads, their fracture toughness becomes a limiting design criterion on the inboard portions of the upper cover. This has led to a desire for alloys for the upper structural members of ultra-large aircraft having very high fracture toughness more akin to that in lower wing skin alloys such as 2324 (U.S. Pat. No. 4,294,625) even if high strength must be sacrificed to some extent. That is, there has been a shift in the optimum combination of strength and toughness needed to maximize weight savings in the upper wing structural members of an ultra-large aircraft to significantly higher fracture toughness and lower strength.

New welding technologies such as friction stir welding have also opened many new possibilities for both design and alloy products for use in wing spar and rib components for weight reduction and/or cost savings. For maximum performance of a spar, the part of the spar which joins to the upper wing skin would have properties similar to the upper skin, and the part of the spar which connects to the lower wing skin would have properties similar to the lower wing skin. This has led to the use of "built-up" spars, comprising an upper spar cap 14 or 22, a web 18 or 20, and a lower spar cap 16 or 24, joined by fasteners (not shown). This "built-up" design allows optimal alloy products to be used for each component. However, the installation of the many fasteners required increases assembly cost. The fasteners and fastener holes may also be structural weak links and parts may have to be thickened which somewhat reduces the performance benefit of using multiple alloys.

One approach used to overcome the assembly cost associated with a built-up spar is to machine the entire spar from a thick plate, extrusion or forging of one alloy. Sometimes, this machining operation is known as "hogging out" the part. With this design, the need for making web-to-upper spar and web-to-lower spar joints is eliminated. A one piece spar fabricated in this manner is sometimes known as an "integral spar". An ideal alloy for making integral spars should have the strength characteristics of an upper wing alloy combined with the fracture toughness and other damage tolerance characteristics of the lower wing alloy. Typically, achieving both properties simultaneously is difficult and requires a compromise between the property requirements for the upper skin and for the lower skin. One disadvantage that an integral spar must overcome is that the strength and toughness properties of a thick product used as the starting stock are typically less than those of thinner products typically used in a "built-up" spar even if the integral spar is made of the same alloy and temper. Thus, the compromise in properties and the use of thick products for an integral spar may result in a weight penalty. One thick product alloy which reasonably meets the property requirements of both an upper and lower spar cap and retains good properties even in thick products because of its low quench sensitivity, is alloy 7085 described in U.S. Pat. No. 6,972,110. Another disadvantage of integral spars, regardless of alloy, is the high ratio of buy weight (i.e., material which is purchased) to fly weight (i.e., weight of material flying on the aircraft) known as the "buy-to-fly." This at least partly diminishes the cost advantages of an integral spar over a built-up spar achieved through reduced assembly cost.

However, new technologies such as friction stir welding make further improvements in both weight and cost a possibility. A multi-component spar joined by friction stir welding or other advanced welding or joining methods combines the advantages of a built-up and integral spar. The use of such methods allows the use of use of products of lesser thickness as well as the use of multiple alloys, product forms and/or tempers which are optimized for each spar component. This expands the alloy product/temper options and improves the material buy-to-fly as in a built-up spar, while retaining a significant portion of the assembly cost advantage of an integral spar.

U.S. Pat. No. 5,865,911 describes a 7000 series alloy envisaged for use as lower wing skin structural members and for wing spar members of ultra-high capacity aircraft. This alloy exhibited improvements in strength, toughness, and fatigue resistance in thin plate form relative to incumbent lower wing alloys such as 2024 and 2324 (U.S. Pat. No. 4,294,625). Similar properties in strength and toughness have been obtained in alloy 7085 (U.S. Pat. No. 6,972,110) in thin plate form as shown in Table 1. Either of these alloys in thin product form would be useful for structural members of a lower wing cover and for the lower spar cap and web of a multi-component spar joined by mechanical fastening or welding. These alloys are also suitable for rib applications in either a built-up or integral design. However, the strength levels achievable in these alloys are typically insufficient for use in upper wing structural members of large commercial aircraft. Higher strength is also beneficial for the upper spar cap, spar web and for ribs provided adequate toughness is maintained.

TABLE 1

Properties of Miyasato alloy (U.S. Pat. No. 5,865,911) and 7085 (U.S. Pat. No. 6,972,110) in thin plate form.

| Property | Dir | Miyasato (1) | 7085 (2) |
| --- | --- | --- | --- |
| UTS (ksi) | L | 82.1 | 82.6 |
|  | LT | 81.4 | 82.2 |
| TYS (ksi) | L | 76.2 | 78.0 |
|  | LT | 75.4 | 77.2 |
| KIc, Kq (ksi$\sqrt{in}$) | L-T | 47.5 | 44.0 |
| RT | T-L | 40.7 | 35.9 |
| KIc, Kq (ksi$\sqrt{in}$) | L-T | 42.0 | 40.5 |
| −65 F. | T-L | na | 34.3 |
| Kapp (ksi$\sqrt{in}$) | L-T | 120.8 | 128.7 |
| RT | T-L | 94.3 | 104.4 |
| Kapp (ksi$\sqrt{in}$) | L-T | 115.5 | 106.8 |
| −65 F. | T-L | 74.7 | 79.0 |
| Kc (ksi$\sqrt{in}$) | L-T | 172.9 | 165.7 |
| RT | T-L | 123.9 | 129.1 |
| Kc (ksi$\sqrt{in}$) | L-T | 166.4 | 140.1 |
| −65 F. | T-L | 79.8 | 84.8 |

(1) U.S. Pat. No. 5,865,911; Rolled plate 1.2 inches thick, 86 inches wide
(2) 7085, U.S. Pat. No. 6,972,110; Rolled plate 1.5 inches thick, 102 inches wide Thus, a need exists for ultra-high capacity aircraft for an alloy that has significantly higher toughness than current alloys used in upper wing structural members while still maintaining an acceptable level of strength. Such an alloy would also be valuable for use in the upper spar cap and spar web of a multi-component spar joined by mechanical fastening or welding as well as for wing ribs of a built-up or integral design. While the needs of ultra-high capacity aircraft and wings have been specifically discussed such an alloy may also prove beneficial for use in fuselage applications and on smaller aircraft both in built-up and integral structures. In addition, non-aerospace parts such as armor for military vehicles may also be made from this invention.

SUMMARY OF THE INVENTION

Aluminum alloy products are particularly well suited for upper wing structural members made from aluminum alloys having from about 6.80 to about 8.5 wt. % Zn, about 1.55 to about 2.00 wt. % Mg, about 1.75 to about 2.30 wt. % Cu; about 0.05 to about 0.3 wt. % Zr, less than about 0.1 wt. % Mn, less than about 0.05 wt. % Cr, the balance substantially Al, incidental elements and impurities. The alloy products are about 4 inches thick or less, and more preferably about 2.5 inches thick or less having significantly higher fracture toughness than prior art alloys used for these applications while maintaining acceptable levels of strength.

Accordingly, it is an object of the invention to provide an improved aluminum alloy of the 7XXX series.

It is another object of the invention to provide aluminum alloy products for spar caps and spar webs of a multi-component spar joined by mechanical fastening or welding.

It is a further object of the invention to provide an alloy product which could be used in wing ribs of built-up or integral design.

These and other objects of the invention are achieved by an alloy consisting from about 6.80 to about 8.5 wt. % Zn, about 1.55 to about 2.00 wt. % Mg, about 1.75 to about 2.30 wt. % Cu; about 0.05 to about 0.3 wt. % Zr, less than about 0.1 wt. % Mn, less than about 0.05 wt. % about Cr, the balance substantially Al, incidental elements and impurities. The composition percent is by weight. It can be in the form of rolled sheets, rolled plates, extrusions or forgings.

These and other objects of the invention will become more apparent through the following description and drawing.

BRIEF DESCRIPTION OF THE DRAWINGS

For a fuller understanding of the invention, reference is made to the following description taken in connection with the accompanying drawing(s), in which.

Like reference characters denote like elements throughout the drawings.

DETAILED DESCRIPTION OF THE PREFERRED EMBODIMENTS

FIG. 1 is a schematic illustrating a transverse cross-sectional view of typical wing box construction 2 comprising upper wing skin 4 and stringers 8, lower wing skin 6 and stringers 10, spaced by spars 12 and 20. Stringers 4 and 10 can be attached separately by fastening or made integral with the skin to eliminate the need for separate stringers and rivets. Typically, two, three or four wing panels 4 or 6 are needed to cover each of the wing upper and lower surfaces depending on aircraft size and wing design. Even more panels may be required for an integral skin and stringer design. The multiple panels comprising the upper and lower skin are typically joined by mechanical fastening. These joints add weight to the aircraft.

The spars may be of a "built-up" design comprised of upper spar cap 14 or 22, lower spar cap 16 or 24 and web 18 or 26 joined by mechanical fastening or they may be of integral one-piece design, each type of design having its own advantages and disadvantages. A built-up spar allows for optimal alloy products to be used for each of the spar components and has improved "buy-to-fly" compared to an integral spar. Typically, the upper spar cap requires high compressive strength while the lower spar caps requires less strength but higher damage tolerance properties such as fracture toughness and fatigue crack growth resistance. An integral spar has much lower assembly costs but its performance may be less than for a built-up design since its properties are necessarily a compromise between the requirements for the upper skin and lower skin. Also, strength and toughness of a thick product used as a starting stock for an integral spar are typically less those of thinner products used for a built-up spar.

The wing box also includes ribs (not shown) which extend generally from one spar to the other. These ribs lie parallel to the plane of FIG. 1 whereas the wing skins and spars run perpendicular to said FIG. 1 plane. Like spars, the ribs can also be of a built-up or integral design with each type having similar advantages or disadvantages as in spars. However, the optimum properties in ribs differ somewhat with high strength being advantageous for rib feet which connect to the upper and lower wing skin and stringers and higher stiffness being advantageous for the web of the rib. More typically, wing ribs are of an integral design with a compromise in properties between the requirements for the rib feet and rib web.

New welding technologies such as friction stir welding and electron beam welding allows for new structural concepts retaining the advantages of current built-up and integral designs while minimizing their disadvantages. For example, the different wing panels 4 used to make the upper skin can be joined by friction stir welding instead of a mechanically fastened joint thereby reducing the weight of the upper skin. Spars and ribs can be made from multiple alloys, tempers and/or products optimized for each spar or rib component joined by friction stir welding, thereby retaining the performance advantage and better buy-to-fly of thinner products as in a built-up spar while reducing assembly costs like an integral spar or rib. For example, upper spar caps 14 and 22 could be made from a high strength alloy or temper extrusion, lower spar caps 16 and 24 from a lower strength damage tolerance alloy or temper extrusion, and the spar webs 18 and 26 from a moderate strength alloy or temper plate, the three components joined by friction stir welding or electron beam welding. Designs containing a mixture of integral and built-up design could be utilized to improve the fail safety and damage tolerance of a component while reducing assembly cost. For example, the upper spar caps 14 and 22 could be joined by friction stir welding to the spar webs 12 and 20 to reduce assembly costs while the lower spar caps 16 and 24 could be mechanically fastened to improve damage tolerance. Further improvements in damage tolerance in built-up, integral welded and structures containing a mixture of both could be achieved by reinforcement with fiber metal laminates and other reinforcing materials as described in U.S. Pat. No. 6,595,467.

The alloy described in U.S. Pat. No. 6,972,110, which has the commercial designation 7085, is primarily directed at thicker gauges, preferably from 4 to 8 inches or greater where low quench sensitivity is important. Low quench sensitivity is achieved by providing a carefully controlled composition which permits quenching thicker gauges while still achieving superior combinations of high strength and toughness and corrosion resistance compared to previous thick product alloys such as 7050, 7010 and 7040. The careful composition employed in 7085 includes low Cu (about 1.3 to about 1.9 wt. %) and low Mg levels (about 1.3 to about 1.68 wt. %) which are among the leanest levels used for commercial aerospace alloys. The Zn levels (about 7 to about 9.5 wt. %) at which the properties were most optimized corresponded to levels much higher than those specified for 7050, 7010 and 7040. This was against past teachings that higher Zn content increases quench sensitivity. On the contrary, the higher Zn levels in 7085 were actually proven to be beneficial against the slow quench conditions of thick sectioned pieces. U.S. Pat. No. 6,972,110 teaches that a good portion of the improved strength and toughness for thick sections of the invention alloy are due to the specific combination of alloying ingredients.

U.S. Pat. No. 5,221,377 that pertains to the 7055 alloy which is typically used for plate and extrusions 2 inches thick or less, teaches that reducing Mg levels results in improved fracture toughness. It is also widely appreciated in the prior art that increasing strength through increased solute content typically results in a reduction in toughness.

Figure 2A:
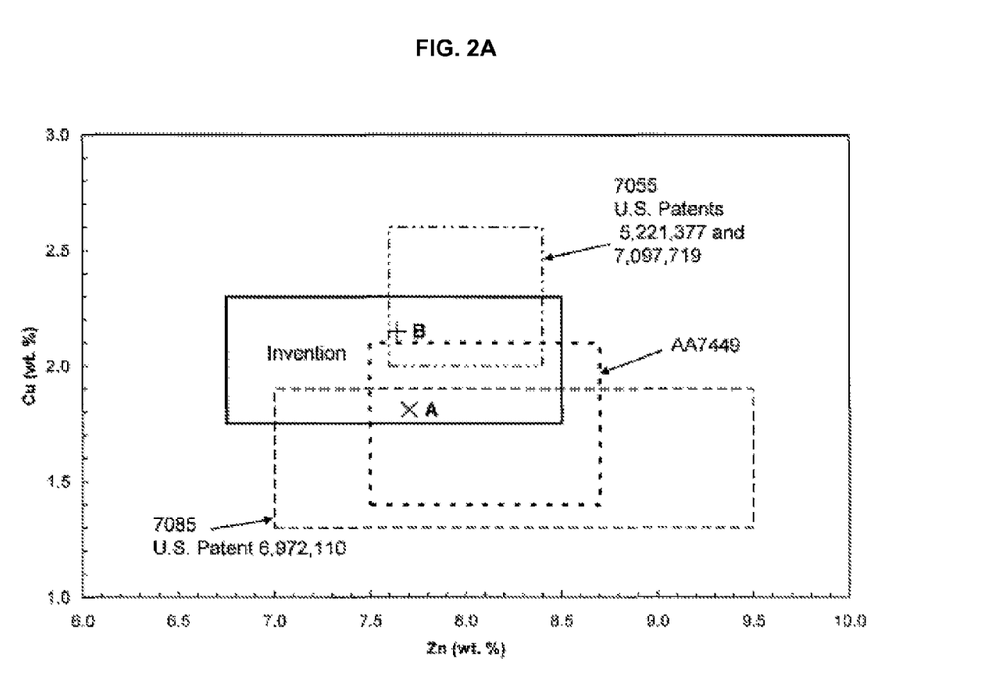
FIGS. 2A and 2B shows the inventive composition in terms of the major alloying elements Cu and Zn and Mg and Zn compared to compositions of 7085 and 7055 and 7449 alloy families, respectively.
Figure 2B:
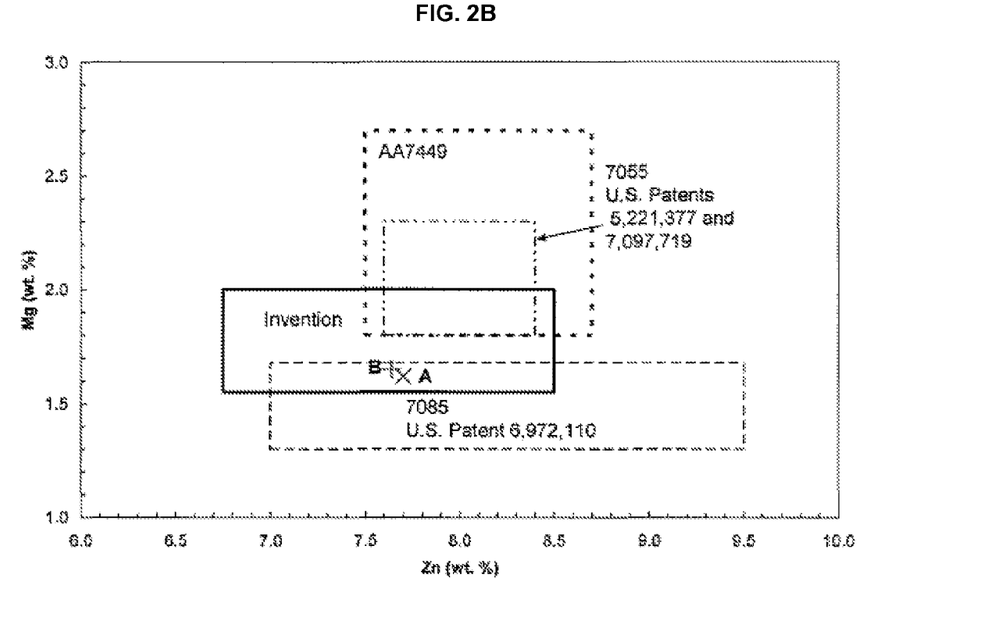

The invention alloy is primarily directed at thinner alloy products, about 4 inches thick or less, and more preferably about 2.5 inches thick or less, for upper wing structural members of large commercial aircraft including wing skins, wing stringers and upper spar caps. These applications will benefit from and in many cases would require higher strength than can be achieved by the 7085 composition. Likewise, higher strength may be beneficial in other applications such as spar webs, ribs and other aerospace components. In order to increase strength, the Mg range of the invention alloy was increased to about 1.55 to about 2.0 wt. % and the Cu range from about 1.75 to about 2.30 wt. %. The Zn range was lowered somewhat to about 6.8 to about 8.5 wt. %. FIGS. 2A and 2B show the inventive composition in terms of the major alloying elements Cu and Zn and Mg and Zn, respectively, compared to compositions of 7085 (U.S. Pat. No. 6,972,110) and 7055 (U.S. Pat. No. 5,221,377) and 7449. The compositions of the invention alloy examples are designated by a rectangular box with solid lines.

From the teachings of U.S. Pat. No. 6,972,110, the composition changes in the invention alloy would increase the quench sensitivity of the alloy somewhat in comparison to alloy 7085 and this is quite possibly the case. However, the invention alloy likely retains some of the benefit of the 7085 composition, and in any case, quench sensitivity is less of a concern in the thinner alloy products at which the invention alloy is directed. The changes in composition were also expected to have a detrimental influence on fracture toughness both because of the resulting increase in strength and the higher Mg content. With the Mg range between that of 7085 and existing upper wing alloys 7055 and 7449, it was believed that the strength and toughness of the invention alloy would fall between these alloys. This was indeed the case for strength. However, the fracture toughness of the invention alloy was improved not over only 7055 and 7449 as expected but, quite surprisingly it was also improved over the 7085 alloy. Thus, the invention alloy identifies an unexpected "sweet" composition region that offers higher combinations of strength and fracture toughness than exhibited by the incumbent alloys.

The alloy products of the present invention can be prepared by more or less conventional practices including melting and direct chill (DC) casting into ingot form and exhibit internal structure features characteristic of ingot derivation. Conventional grain refiners such as those containing titanium and boron, or titanium and carbon, may also be used as is well-known in the art. Once an ingot has been cast from this composition, it is scalped (if needed) and homogenized by heating to one or more temperatures between about 800° and about 900° F. with about 850° and about 900° F. a preferred range. After homogenization, these ingots are worked by, for example, rolling into plate or sheet or extruding or forging into special shaped sections. For most aerospace applications, alloy products made from the invention composition have a preferred cross-sectional thickness of about 4 inches thick or less, and more preferably about 2.5 inches thick or less. The product, if desired, should then be solution heat treated by heating to one or more temperatures between about 850° and about 900° F. to take substantial portions, preferably all or substantially all, of the soluble zinc, magnesium and copper into solution, it being understood that with physical processes which are not always perfect, probably every last vestige of these main alloying ingredients will not be dissolved during solution heat treatment. After heating to elevated temperatures as just described, the product should be rapidly cooled or quenched to complete the solution heat treatment procedure. Such cooling is typically accomplished by immersion in a suitably sized tank of cold water or by water sprays. Air chilling may also be used as a supplementary or substitute cooling means. After quenching, certain products may need to be mechanically stress relieved such as by stretching and/or compression up to about 8%, for example from about 1 to about 3%.

A solution heat treated and quenched product, with or without cold working, is then considered to be in a precipitation-hardenable condition, or ready for artificial aging. The invention alloy may be two-step or three-step practice and for some applications even a single step practice may suffice. However, it should be understood that clear lines of demarcation may not exist between each step or phase. It is generally known that ramping up and/or down from given (or target) treatment temperatures, in itself, can produce precipitation (aging) effects which can, and often need to be, taken into account by integrating such ramping conditions, and their precipitation hardening effects, into the total aging treatment program. Such integration was described in greater detail in U.S. Pat. No. 3,645,804, the disclosure of which is fully incorporated by reference herein.

U.S. Pat. No. 6,972,110 describes a preferred three (3) step aging practice for the 7085 alloy. The preferred 3 step practice is demonstrated to provide a highly desirable combination of strength and fracture toughness with superior stress corrosion cracking (SCC) resistance. While 3 step practices are known in the prior art, the practice for 7085 differed in that the second step takes place at temperatures of about 290 to about 335° F. which is 40 to 50° F. lower than most prior art alloys. The first and third steps take place at temperatures between about 200 to about 275° F. The improved SCC resistance of 7085 was attributed to the 3rd step based on results from 2 step and 3 step practices which showed significant improvements in SCC resistance using the 3 step practice.

A 3 step aging practice with the same or similar temperature ranges may also be used with the invention alloy, but a 2 step practice is preferred for some of the principal applications envisioned. The 2 step practice can be either the low temperature step followed by the high temperature step or vice versa. For example, a 2 step practice is preferred for upper wing skins and stringers. These components are often age formed by the aircraft manufacturer to obtain the contour of the wing. During age forming, the part is constrained in a die at an elevated temperature usually between about 250 and about 400° F. for several to tens of hours, and the desired contour are accomplished through creep and stress relaxation processes. The age forming is preferably accomplished in conjunction with the artificial aging treatment, especially during the high temperature step at which creep occurs most rapidly. The age forming is typically done in an autoclave furnace. The autoclave and dies required to age form an aircraft wing panel for a large commercial aircraft are large and expensive and as a result few are employed in the manufacturing process. Thus, it is desirable that the age forming cycle be as short as practicable while still achieving the required contour and properties in the alloy product so that production throughput is maximized. A shortening of the third step or its complete elimination is beneficial in achieving this goal. In a low-high 2 step practice the first step can be applied by the alloy producer, further minimizing the time expended in the age forming process.

The results of SCC studies on the invention alloy indicate that the third step can indeed be shortened and even eliminated while meeting the SCC requirements for upper wing skin and stringers. The 3 step practice preferred for 7085 in thick product applications is unnecessary for the invention alloy in upper wing and other high strength applications for several reasons. For instance, the SCC requirements for upper wing components are less stringent than those for a thick product application such as a rib or spar. The upper wing components are predominantly subjected to compressive stresses while the spar, in particular the lower portion, is subjected to tensile stresses. Only tensile stresses contribute to SCC. Also, an integral spar or rib machined from a thick product can have significant design stresses in the ST direction. For example, the spar caps of an integral spar made from plate are in the L-ST plane of the parent plate. In comparison, the principal design stresses in the upper skin and stringer are predominantly in the L-LT plane which is less prone to SCC. As a result of these differences, the minimum SCC requirement in the ST direction for the incumbent upper wing alloys 7055 and 7449 is 15 or 16 ksi allowing these alloys to be used in the high strength −T7951 temper while thick products for spars, ribs and other applications are typically used in the lower strength −T7651 and −T7451 tempers which typically have SCC minimums of 25 and 35 ksi, respectively. A second reason is that the invention alloy contains more Cu than 7085. The Cu content in 7085 is intentionally low to provide low quench sensitivity in thick products. This is less of a concern for the thinner alloy products at which the invention is directed. Those skilled in the art will appreciate that increasing Cu in 7XXX alloys typically improves SCC resistance.

The invention alloy is also envisaged for use in a multi-component, multi-alloy spar or rib joined by mechanical fastening or welding. As already described, these applications will likely have higher SCC requirements than for upper wing skin and stringers. However, in a multi-component spar made up of thinner products the grain structure can be more favorably oriented for SCC resistance than for an integral spar machined from thick plate. The spar caps, for example, can be machined from the more SCC resistant L-LT plane of a parent plate or extrusion instead of the L-ST plane. The minimum SCC performance in the L and LT directions is typically greater than 40 ksi, even in the less SCC resistant high strength tempers, compared to 25 or 35 ksi in the ST direction for the lower strength, higher SCC resistant tempers. Thus, it may be the case that the 3rd step aging practice preferred for 7085 can also be shortened or eliminated for the invention alloy even for spar, rib and other applications having more demanding SCC requirements. Shortening or elimination of the third step does result in a small strength reduction, typically about 1 to about 2 ksi. However, it may be the case that this strength reduction can be compensated for by the use of higher strength tempers not practicable in thick products. Even so, for some built-up, integral or multi-component applications of the present invention, lower strength tempers such as the −T7451 or −T7351 may be desirable, either for the additional corrosion resistance provided or for additional improvements in fracture toughness.

In the case of multi-alloy spar or rib joined by welding, the flexibility in the aging practice exhibited by the invention alloy is a desirable characteristic. The welding, either by fusion welding methods or solid state methods such as friction stir welding, is preferably performed in an intermediate temper instead of in the final alloy temper as post weld aging is typically desirable to improve the strength and corrosion properties of the weld. For example, the welding of the invention alloy to another alloy having strength and damage tolerance properties more suitable for the lower spar cap, could be performed after the application of the first aging step of either a 2 or 3 step practice in the invention alloy. The other alloy could be another 7XXX alloy or quite different in composition, for example an aluminum-lithium alloy in accordance with U.S. Pat. No. 4,961,792, and will have its own preferred aging practice which may be comprised of one, two or three steps. Since the post-weld aging of the two joined alloy products must necessarily occur together, the aging practice of the invention alloy may need to be two or three steps depending on the aging requirements of the alloy to which it is joined. Thus, the flexibility of the invention alloy with respect to the number of aging steps and times that can be successfully utilized is beneficial for welded multi-alloy components. Even so, some compromises to the preferred aging practice for each alloy may be required depending on the specific alloys involved.

The manufacture and aging of a multi-alloy component with the invention alloy joined by welding could be somewhat simplified by using 7XXX alloys with similar compositions to the invention alloy but that are leaner or richer in alloying elements added for strengthening to achieve the desired balance of strength and toughness in each component. The preferred pre- and post-weld aging practices for such alloys would likely be more compatible than for more dissimilar alloys requiring fewer adjustments to their preferred practices. Alternatively, the desired differences in strength and toughness could likely be achieved in some cases with the use of the invention alloy alone by employing different tempers. For example, a multi-temper spar solely made from the invention alloy could use a the high strength –T7951 temper in the upper cap, the moderate strength, higher toughness –T7651 temper in the spar web, and the lower strength, highest toughness –T7351 temper in the lower spar cap. Typically, the aging times for the –T7651 and –T7351 would be greater than for the –T7951 temper. In a welded multi-temper spar, the pre-weld aging for the –T7951 upper spar could be, for example, comprised of a first step only, the –T7651 spar web comprised of a first step and a portion of the second step and the –T7351 lower spar cap of a first step and a larger portion of the second step. This could be carried out separately on each component or by staggering their removal from the same furnace. Once welded, the same post weld aging practice would be used on the joined components. With the appropriate selection of the pre- and post-weld aging practice the preferred aging practice can be applied to each component essentially without compromise.

Example 1

Two ingots each of representative compositions (Alloys A and B) of the invention alloy family were cast as large commercial scale ingots. The compositions of the invention alloy examples Alloy A and Alloy B are designated by a solid line rectangular box, respectively, in FIGS. 2A and 2B. In addition, one ingot of aluminum alloy 7085 (U.S. Pat. No. 6,972, 110) was cast as a control. The composition of the ingot and the composition ranges for 7085 registered with the Aluminum Association are also shown in Table 2. The ingots were scalped and homogenized with a final soak temperature of about 890° to about 900° F. One ingot each of the invention alloy was hot rolled to plate having a thickness of 1.07 inches thick and a width of 135 inches wide and the second ingot to a thickness of 1.10 inches thick and width of 111 inches wide. The former will be hereafter referred to as Plate 1 and the latter as Plate 2. These plate sizes are representative of upper wing panels of an ultra-large capacity aircraft. The 7085 control was hot rolled to Plate 1 thickness and width. These plates were solution heat treated between about 880° to about 895° F. for about 70 minutes, water spray quenched to ambient temperature, and cold stretched about 1.5 to about 3%. Samples from the plates of the Alloys A and B and the 7085 control were aged to a high strength T79-type temper suitable for upper wing components using a three step practice in accordance with U.S. Pat. No. 6,972,110. The three step practice consisted of a first step of about 6 hours at about 250° F., a second step of about 7 hours at about 308° F. and a third step of about 24 hours at about 250° F. In addition, samples of an improved version of aluminum alloy 7055 (U.S. Pat. No. 7,097,719) were cut from a number of different production lots of plate of the same or similar width and thickness and given the high strength T7951 temper and several overaging tempering treatments to decrease the strength level and increase fracture toughness. The composition ranges for standard 7055 (U.S. Pat. No. 5,221,377) and the narrower composition range for the improved version (U.S. Pat. No. 7,097, 719) are also shown in Table 2. The aging practice for the –T7951 temper of the improved version of 7055 was a two step practice consisting of a first step of 10 hours at 302° F. and a second step of 6 hours. The overaged tempers were obtained by increasing the first step from about 10 hours to about 19 to about 24 hours. The composition of 7449 is also shown.

TABLE 2

| Alloy | wt. % Zn | wt. % Cu | wt. % Mg | wt. % Fe | wt. % Si | wt. % Zr |
|---|---|---|---|---|---|---|
| A | 7.70 | 1.81 | 1.62 | 0.024 | 0.014 | 0.11 |
| B | 7.64 | 2.15 | 1.65 | 0.028 | 0.021 | 0.1 |
| 7085 | 7.60 | 1.62 | 1.48 | 0.032 | 0.015 | 0.11 |
| 7085 AA Range | 7.0-8.0 | 1.3-2.0 | 1.2-1.8 | 0.08 max | 0.06 max | 0.08-0.15 |
| 7055 Improved | 7.6-8.4 | 2.0-2.6 | 1.8-2.3 | 0.09 max | 0.06 max | 0.08-0.25 |
| 7055 AA Range | 7.6-8.4 | 2.0-2.6 | 1.8-2.3 | 0.15 max | 0.10 max | 0.08-0.25 |
| 7449 AA Range | 7.5-8.7 | 1.4-2.1 | 1.8-2.7 | 0.15 max | 0.12 max | (1) |

(1) 0.25 max Zr + Ti

The tensile and compressive strength, plane strain ($K_{Ic}$) and apparent plane stress ($K_{app}$) fracture toughness and exfoliation resistance of invention alloys A and B and the 7085 and improved 7055 controls were measured. Tensile testing was performed in accordance with testing standards ASTM E8 and ASTM B557 and compression testing in accordance with ASTM E9. Plane strain ($K_{Ic}$) fracture toughness testing was conducted in accordance with ASTM E399. The plane strain fracture toughness specimens were of full plate thickness and had a width W of 3 inches. Plane stress ($K_{app}$) fracture toughness testing was conducted in accordance with ASTM E561 and B646. Those skilled in the art will appreciate that numerical value of $K_{app}$ typically increases as the test specimen width increases. $K_{app}$ is also influenced by specimen thickness, initial crack length and test coupon geometry. Thus, $K_{app}$ values can only be reliably compared from test specimens of equivalent geometry, width, thickness and initial crack length. Accordingly, testing on the invention alloy and the 7085 and 7055 controls were all performed using center-cracked M(T) specimens having the same nominal dimensions, a width of 16 inches, thickness of 0.25 inches and an initial fatigue pre-crack length 2ao of 4 inches. The specimens were centered at mid-thickness (T/2) of the plate. Exfoliation testing using the EXCO method was performed in accordance with ASTM G34. Test specimens were taken at mid-thickness (T/2) and one-tenth thickness (T/10).

Figure 4:
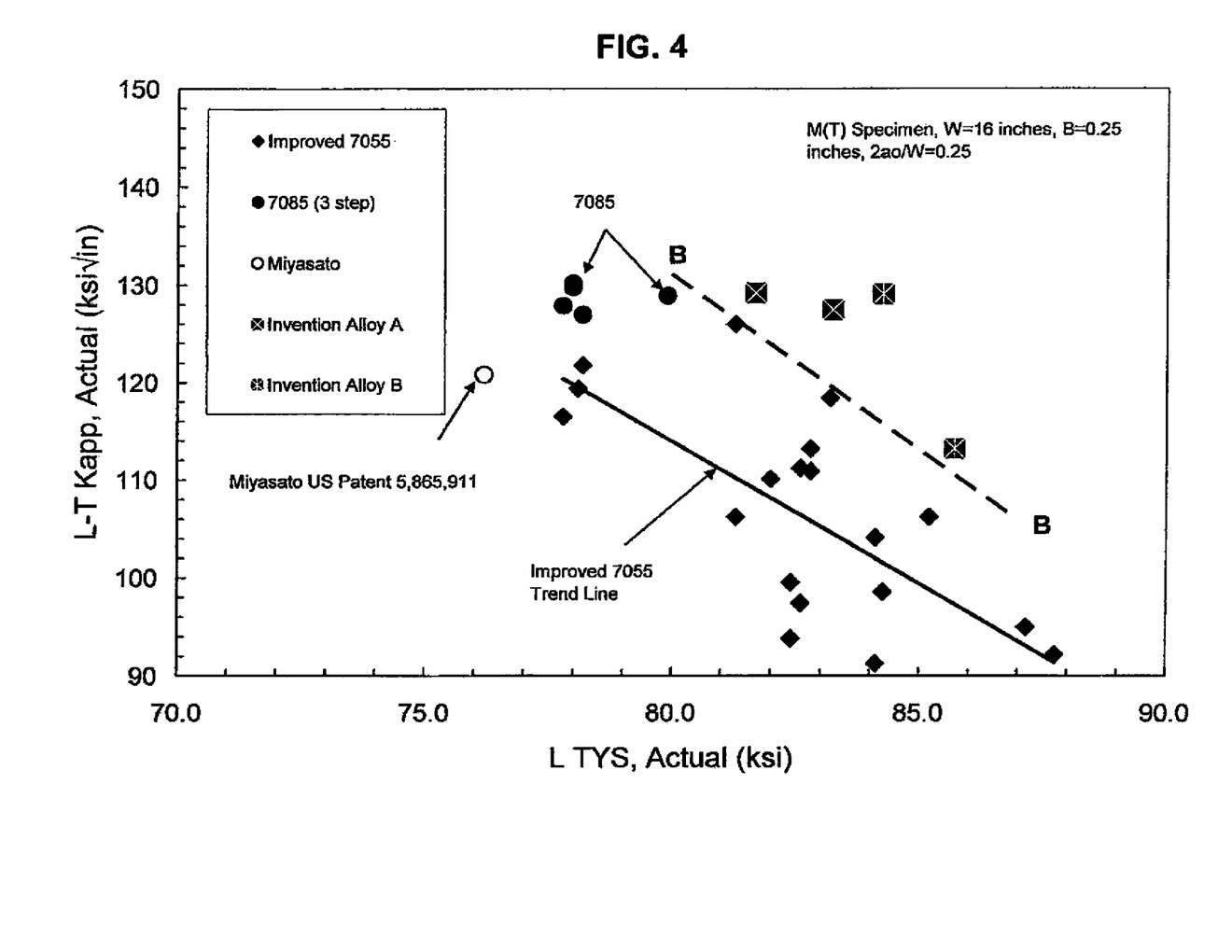
FIG. 4 is a graph comparing the typical L-T plane stress fracture toughness $K_{app}$ versus the actual or measured tensile yield strength of the invention in thin plate form and several thin plate products including commercial 7085, and improved 7055 alloys.

The measured properties of example Alloys A and B and the nominal 7085 composition are given in Table 3. Alloy A exhibited an approximately 3 ksi increase in tensile yield and ultimate tensile strength over the nominal 7085 composition in Plate 1 size in both the L and LT direction, a strength increase of about 4%; while Alloy B exhibited about a 5 ksi increase in tensile yield and ultimate tensile, an improvement of about 6%. These are considered significant strength improvements by aircraft manufacturers. The improvement in strength was obtained while retaining the excellent exfoliation resistance characteristic of the 7085 alloy, all specimens of the invention alloy achieving an EA rating.

improved combination of strength and toughness of 7085 with respect to the improved version of 7055 is obvious. For the invention alloy and the overaged tempers of 7055 for which no material specifications currently exist the minimum tensile yield strength was estimated by subtracting 3 ksi from the measured value. A preferred minimum performance line for the invention is designated by the line B-B. Even with significant averaging to achieve the same or similar strength level as in the invention alloy, the fracture toughness of 7055 is significantly lower. Since the Cu and Mg levels in the invention alloys lies between that of 7085 and the improved version of 7055, while Fe and Si levels are similarly low, the expectation was that the combination of strength and toughness achievable in the invention alloy would fall between that of 7085 and improved 7055. Surprisingly, the invention alloys exhibited an improved combination of strength and toughness, not only over improved 7055 but also over 7085. The invention thus identifies a "sweet" composition region which offers higher combinations of strength and fracture toughness than exhibited by prior art alloys. While the $K_{app}$ values and relative improvements correspond to a test coupon of the type and dimensions noted, it is expected that similar relative improvements will be observed in other types and sizes of test coupons. However, those skilled in the art will also appreciate that the actual $K_{app}$ values may vary significantly in other specimen types and sizes as previously described and the magnitude of the difference may also vary.

Example 2

Four sets of samples in the solution heat treated, quenched and stretched condition (W51 temper) from invention alloy A

TABLE 3

| Alloy/Panel | Dir | UTS (ksi) | TYS (ksi) | CYS (ksi) | KIc (ksi√in) | Kapp (ksi√in) | EXCO |
|---|---|---|---|---|---|---|---|
| 7085 (U.S. Pat. No. 6,972,110) | L | 83.7 | 79.9 | 81.4 | 50.6 | 128.9 | EA (t/2) |
| Panel 1 | LT | 83.7 | 79.6 | na | 41.1 | 102.6 | EA (t/10) |
| Invention Alloy A | L | 86.7 | 83.2 | 84.3 | 50.9 | 127.5 | EA (t/2) |
| Panel 1 | LT | 86.8 | 82.6 | na | 40.8 | 94.0 | EA (t/10) |
| Invention Alloy A | L | 85.8 | 81.7 | 83.0 | 49.1 | 129.2 | EA (t/2) |
| Panel 2 | LT | 85.7 | 81.5 | na | 39.6 | 91.9 | EA (t/10) |
| Invention Alloy B | L | 89.3 | 85.7 | 86.7 | 43.8 | 113.2 | EA (t/2) |
| Panel 1 | LT | 89.2 | 85.0 | na | 34.2 | 78.6 | EA (t/10) |
| Invention Alloy B | L | 87.8 | 84.3 | 86.4 | 43.6 | 129.1 | EA (t/2) |
| Panel 2 | LT | 88.5 | 84.1 | na | 34.5 | 86.0 | EA (t/10) |

Figure 3:
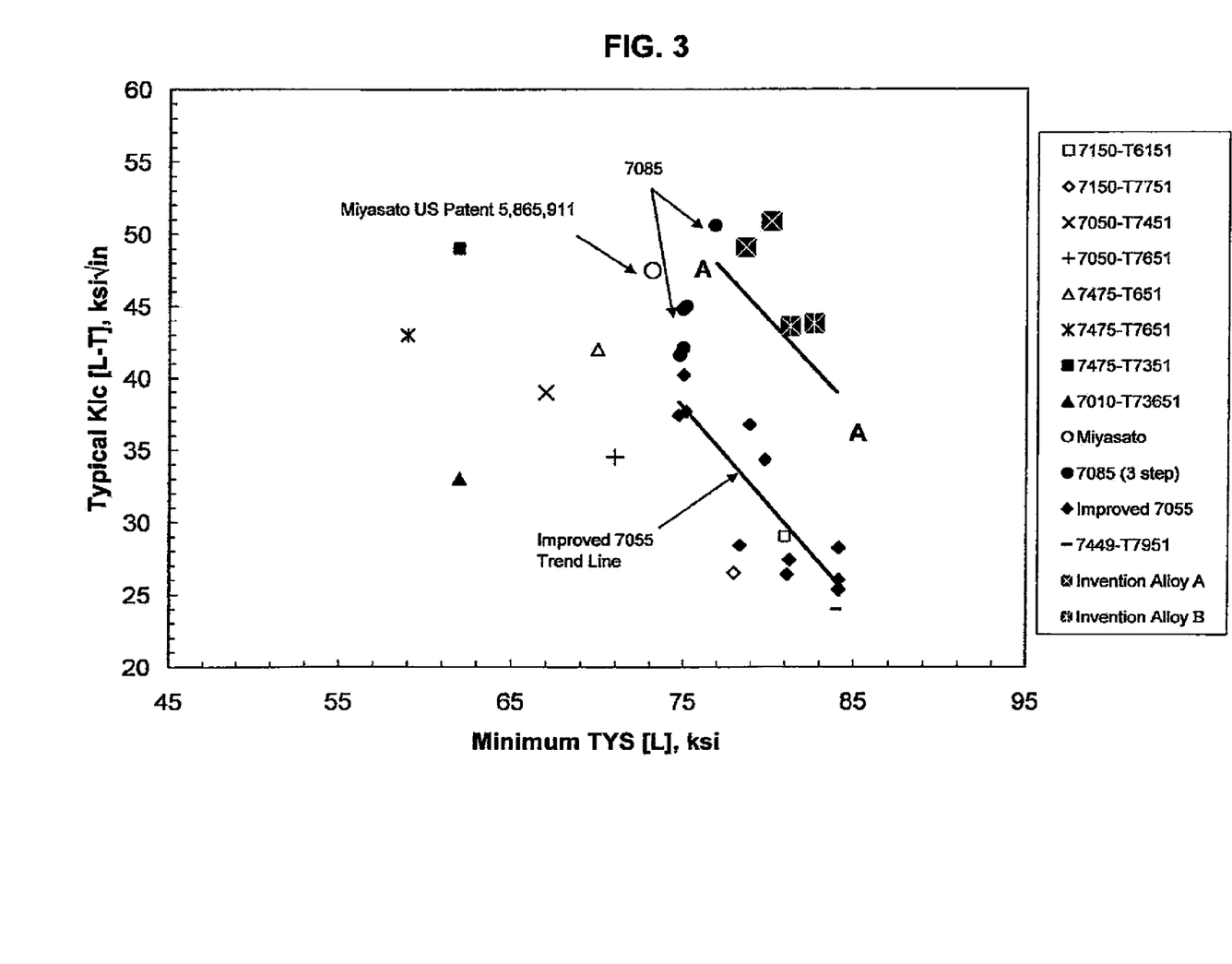
FIG. 3 is a graph comparing the typical L-T plane strain fracture toughness $K_{Ic}$ versus the minimum longitudinal tensile yield strength of the invention in thin plate form and several other alloys in thin plate form (<2.5 inches) including commercial 7085, improved 7055 and 7449 alloys.

The combinations of strength and toughness in invention Alloys A and B are shown in FIGS. 3 and 4 where they are compared to prior art alloys. FIG. 3 compares plane-strain fracture toughness $K_{Ic}$ in the L-T orientation, which corresponds to the principal direction of loading in the upper wing, as a function of the minimum tensile yield strength in the L (rolling) direction of invention Alloys A and B, the 7085 (U.S. Pat. No. 6,972,110) control lots (Table 3) another four lots of 7085 thin plate given a lower strength aging practice more suitable for lower wings (Table 1), and values from the improved version of 7055 (U.S. Pat. No. 7,097,719) in the T7951 temper and with overaged tempering treatments. In addition, typical fracture $K_{Ic}$ fracture toughness in other prior art alloys in thin plate form (<2.5 inches) are shown. A preferred minimum performance line for the invention is designated by the line A-A.

FIG. 4 compares the apparent plane stress fracture toughness $K_{app}$ of the invention alloys in the L-T orientation again with the five lots of 7085 and values from improved 7055. The and B plate fabricated in Example 1 were given the first two aging steps of the three step practice used in Example 1. Subsequently, the first set of samples were given a third step with an aging time of 24 hours, the same as that employed in Example 1, while the second and third set were given shorter aging times, of 6 and 12 hours. In the fourth set of samples, the third step was not applied (0 hours). Tensile specimens with a diameter of 0.125 inch were machined in the long transverse (LT) direction and short transverse (ST) direction for both alternate immersion (AI) and seacoast (SC) exposure. Alternate immersion testing was conducted in ASTM G47 and G44. More specifically, the specimens were exposed to cycles of immersing in a 3.5% NaCl aqueous solution for 10 minutes, followed by 50 minutes of air drying while being stressed under a constant strain necessary to achieve the desired stress level. The seacoast testing was conducted at Alcoa's Pt. Judith, R.I. seacoast exposure site.

Three 3rd step aging times, 0, 12 and 24 hours, and two stress levels, 16 and 20 ksi were selected for the ST direction.

The first stress level represents the minimum requirement for current upper wing alloys, 7055 and 7449 in the ST direction. The second stress level corresponds to a 25% higher stress level. The exposure period for AI testing for 7XXX alloys for the ST direction is typically 20 or 30 days or until failure occurs. In these tests, the maximum exposure period for AI was extended to 150 days to better assess the performance of the different aging practices. For seacoast exposures, the maximum exposure period was 466 days. The results of the ST tests are given in Table 4.

TABLE 4

| Alloy | Panel | 3rd Step Time (h) | LT Tensile (ksi) | | SCC Testing | | | |
| --- | --- | --- | --- | --- | --- | --- | --- | --- |
| | | | YS | UTS | Location | Stress (ksi) | # of tests | Failure (days) |
| A | 2 | 0 | 82.5 | 86.2 | AI | 16 | 5 | 48, 101, 101, 101, 115 |
| | | | | | AI | 20 | 5 | 32, 59, 70, 101, 115 |
| | | | | | SC | 16 | 5 | 297, 311 |
| | | | | | SC | 20 | 5 | 290, 290, 339, 349 |
| A | 2 | 12 | 83.8 | 87.4 | AI | 16 | 5 | 78, 97, 101 |
| | | | | | AI | 20 | 5 | 53, 98, 101, 101, 101 |
| | | | | | SC | 16 | 5 | 325, 339 |
| | | | | | SC | 20 | 5 | 66, 325, 339, 367 |
| A | 2 | 24 | 83.7 | 87.3 | AI | 16 | 5 | 101, 101, 101, 115, 129 |
| | | | | | AI | 20 | 5 | 44, 73, 98, 101, 143 |
| | | | | | SC | 16 | 5 | 332 |
| | | | | | SC | 20 | 5 | 332, 346, 346, 402 |
| A | 1 | 12 | 84.1 | 87.6 | AI | 16 | 5 | 87, 129, 143, 143 |
| | | | | | AI | 20 | 5 | 59, 98, 101, 101, 101 |
| | | | | | SC | 16 | 5 | 325, 332, 332, 339 |
| | | | | | SC | 20 | 5 | 325, 332, 339 |
| B | 2 | 12 | 85.5 | 89.2 | AI | 16 | 5 | 115, 135, 135 |
| | | | | | AI | 20 | 5 | 29, 54, 101, 101, 115 |
| | | | | | SC | 16 | 5 | 234, 332 |
| | | | | | SC | 20 | 5 | 122, 311, 325 |

The results from invention Alloy A, Panel 2 with 3rd step aging times of 0 (i.e., no third step) 12 and 24 hours indicate there is no significant difference in the SCC resistance of the invention alloy with or without a 3rd aging step or for a shorter or longer 3rd step aging time. In all cases, the number of days to failure exceeded the standard exposure times of 20 or 30 days for 7XXX alloys for AI at both the 16 ksi stress level, the minimum requirement for current upper wing alloys, and at the 25% higher stress level of 20 ksi. The number of days to failure was also similar for the 3 different aging times. The SCC resistance of the three 3rd step aging times was also similar for the seacoast exposures. Alloy A, Panel 1 and invention Alloy B, Panel 2 were evaluated only for the 12 hour 3rd step aging time. Panel 1 is thinner and wider than Panel 2 and therefore is expected to have a different grain aspect ratio and possibly different SCC resistance. The results for Alloy A, Panel 1, appeared to be slightly better than those for Panel 2. The results for Alloy B, Panel 2 were similar and possibly better than for Alloy A, Panel 2 as would be expected with its higher Cu content.

The stress levels for the LT direction were 42 and 63 ksi, corresponding to approximately 50% and 75% of the LT yield strength of the invention alloy. For the LT direction, the exposures were interrupted after 30, 47 and 90 days and the exposed specimens subjected to breaking load testing in accordance with ASTM G 139. The percentage retained or residual strength of the exposed specimen compared to the unexposed tensile strength was determined. This test is a means to obtain more quantitative information in a shorter time, and thus is useful for the more SCC resistant LT direction where specimen failures are expected to occur at longer times and possibly with greater scatter, than the less SCC resistant ST direction. In one experiment, breaking load tests were conducted on invention Alloys A and B given a 3rd step aging practice of 0, 6 and 12 hours after an exposure period of 47 days. In a second experiment, breaking load tests were conducted on invention Alloy A and a 7055-T7951 control after exposure periods of 30 and 47 days in AI and 90 days seacoast exposure at a stress levels corresponding to 50 and 75% of the LT yield strength for each alloy. In both experiments, unstressed samples were also included. The inclusion of unstressed and stressed samples allows the strength loss resulting from general corrosion and pitting and the loss from SCC to be separated.

Figure 5:
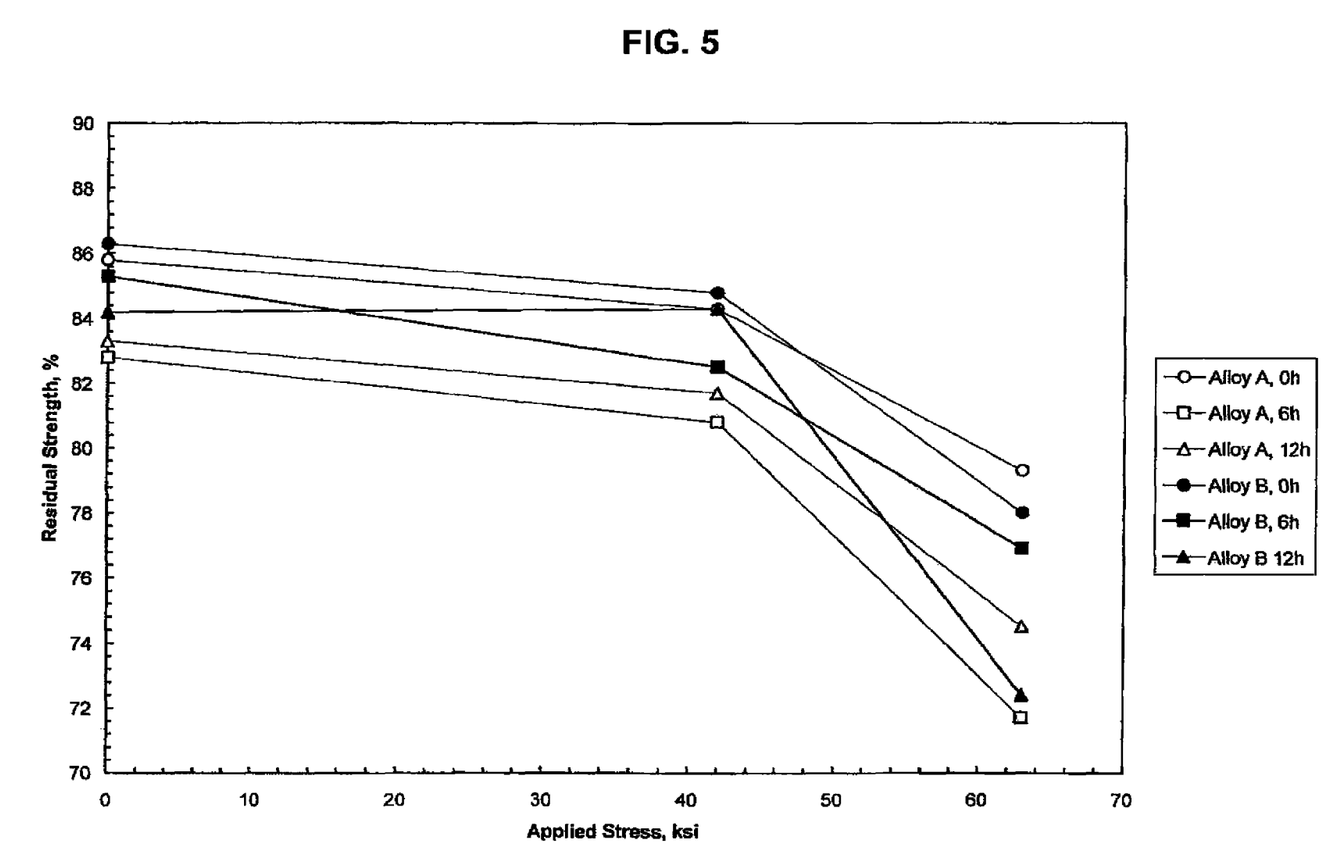
FIG. 5 is a graph comparing the percentage retained strength after corrosion exposure in the LT direction of two invention compositions for three 3rd step aging times of 0, 6 and 12 hours.
Figure 6:
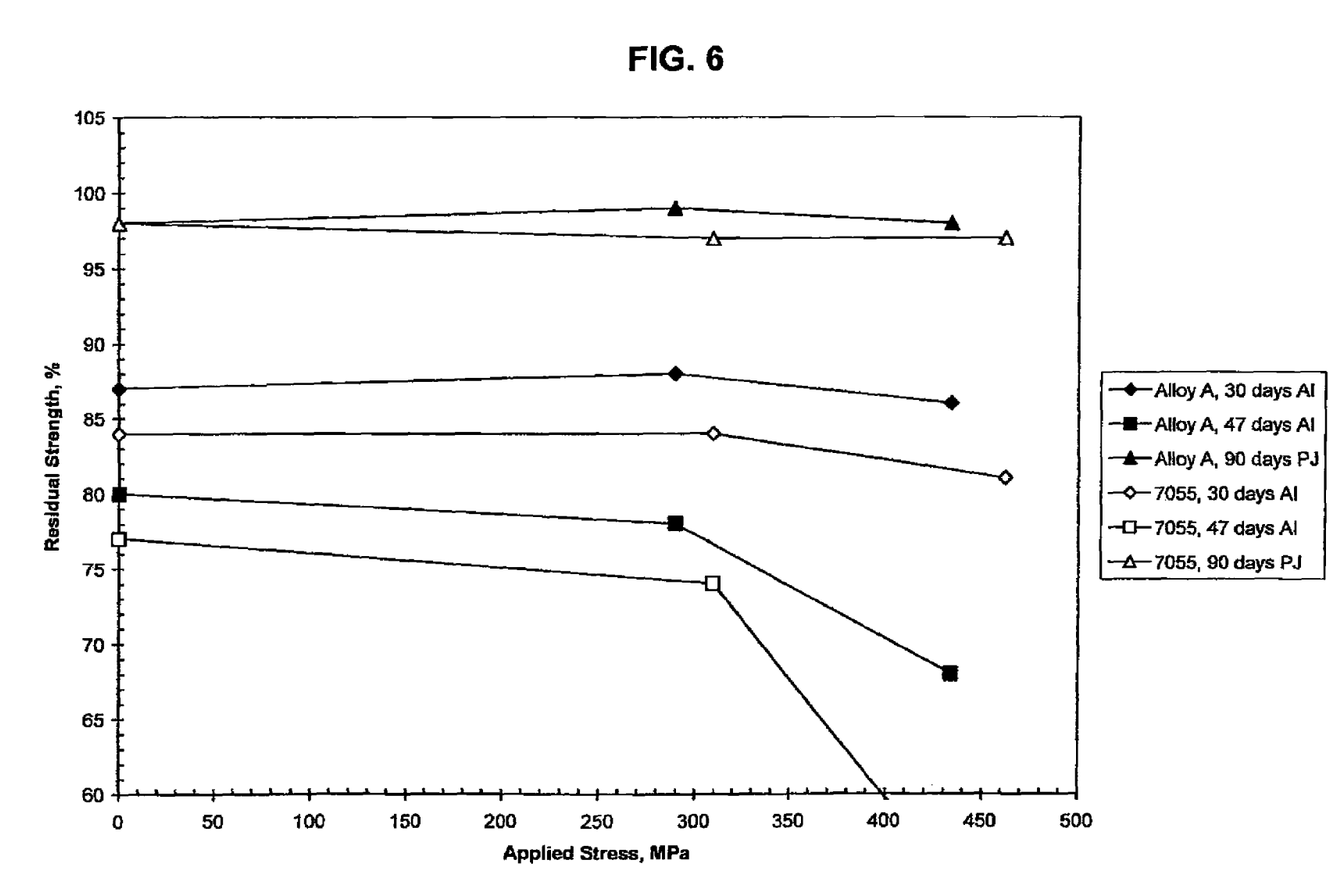
FIG. 6 is a graph comparing the percentage retained strength after corrosion exposure in the LT direction of the invention alloy and prior art 7055 alloy for a 12 hour 2nd step aging time.

The results of the first experiment are shown in FIG. 5 each point representing an average of 5 specimens. Here, the percentage retained strength is the ratio of the strength of an exposed specimen to that of an unexposed specimen (i.e., uncorroded) expressed on a percentage basis. The results indicate there was no loss in general corrosion resistance (unstressed) or SCC resistance (stressed) with the elimination of the 3rd aging step. In fact, the specimens without the 3rd step had a greater retained or residual strength than those with a 6 or 12 hour 3rd step. For a given aging time, Alloy B outperformed Alloy A as would be expected with its higher Cu content. The results of the second experiment are given in FIG. 6, each point representing an average of 5 specimens. FIG. 6 is a graph comparing the percentage retained strength in the LT direction of the invention alloy and prior art alloy 7055 for a 12 hour 2nd step aging time following exposures of 30 and 47 days in 3.5% NaCl solution and 90 days seacoast exposure at stress levels of 50 and 75% of the yield strength of each alloy. Invention Alloy A had greater percentage retained strength than the 7055 for all three exposures in both the unstressed and stressed condition and at the two stress levels.

Overall, the corrosion results indicate that both the 2 and 3 step aging practice provide acceptable corrosion performance of the invention alloy for upper wing applications. One disadvantage of the 2 step practice is that the strength is slightly lower as can be seen in Table 4 for invention Alloy A. Compared to 3rd step age time of 24 hours the yield strength without the 3rd step was about 1 ksi higher. As previously described, the flexibility in aging practice of the invention alloy is a beneficial characteristic. A 2 step practice is preferable for applications such as upper wing skin and stringer where the aging is partly or fully applied during an age forming process by the aircraft manufacturer or subcontractor and it is desirable that the age forming cycle be as short as practicable to maximize production throughput. In this regard, the invention alloy with the 2 step practice utilized herein which had a total soak time of 13 hours, offers an improvement over the current upper wing alloys. Depending on the age forming requirements, this could possibly be shortened further to about 7 hours if the first step is applied by the material producer and only the second step is carried out in the age forming process.

A 3 step practice may be preferred when the material is supplied by the producer in the fully aged condition for applications such as an upper wing spar or spar web in a built-up design. A lower strength temper such as a T7651 or T7451 temper, using either a 2 or 3 step practice, may also be preferable for these applications depending on the requirements and the direction of the design stresses relative to the alloy products grain orientation. When the invention alloy is to be welded to another alloy product and post weld aged as part of a multi-alloy component, a 2 or 3 step practice could be preferable depending on the aging practice of the alloy or alloys to which the invention alloy is to be joined. The flexibility afforded by the invention alloy may also be useful for combining the curing cycles of adhesives used to attach reinforcing materials with the aging of the invention alloy.

Example 3

Samples of invention alloy A plate in the solution heat treated, quenched and stretched condition (W51 temper) fabricated in Example 1 were machined into panels 0.5 inch thick by 6 inches wide by 35 inches long. Samples from 2099 extrusion were acquired in the T3511 temper and machined to the same dimensions. In both cases the length dimension was in the rolling direction 2099 is a commercially available aluminum-lithium alloy registered with the Aluminum Association having the composition 2.4-3.0 wt. % Cu, 0.1-0.5 wt. % Mg, 0.4-1.0 Zn, 0.1-0.5 Mn, 0.05-0.12 Zr and 1.6-2.0 Li, the remainder Al and incidental impurities. Panels of the invention alloy A and 2099 were joined by friction stir welding with the weld line along the length of the panels. This combination of the invention alloy and 2099, which have very dissimilar compositions could be used, for example, for a multi-alloy spar or rib. In a spar, the invention alloy could be used in the upper cap and web where high compressive strength is needed and 2099 in the lower spar cap where high resistance to fatigue crack growth is beneficial. Similarly, in the rib, the invention alloy could be used in the feet where high strength is important and 2099 in the spar web where high stiffness and low density are beneficial.

Prior to the friction stir welding operation, the Alloy A and 2099 panels were aged separately. The pre-weld aging for Alloy A consisted of a first step of 6 hours at 250° F. while the pre-weld aging practice of 2099 consisted of a first and second step of different times and/or temperatures than that used for the invention alloy. The post-weld aging practice of the joined panels was necessarily the same and consisted of a first step of 6 hours at 250° F. and a second step of 18 hours at 305° F. Post-weld aging is desirable for improving the strength and corrosion properties of the weld area. In order to maximize the weld properties, in particular the strength and corrosion resistance, as much of the aging as possible should be conducted after welding. However, for dissimilar alloys the ability to do so may be limited by the individual aging requirements for each alloy and the final desired temper for each. The pre-weld aging practices for each alloy and the post-weld aging practice for the multi-alloy panel were carefully selected to target a −T7651 type temper in the invention alloy and a −T83 type temper in the 2099. Even so, some compromise in the aging practices of both alloys was necessary and the flexibility of the invention alloy with respect to the number of aging steps and times that can be successfully utilized while obtaining good properties was beneficial in that regard.

Mechanical properties including tensile strength, compressive strength, tensile and compressive elastic modulus and fracture toughness were measured in the base metals (i.e., outside the weld and heat affected zone), the heat affected zone (HAZ) and the weld following the post-weld age. The extent of the each region and the position of the specimens therein were determined using Vicker's micro-hardness (THE) measurements across the weld and optical micrographs. The testing was performed in accordance with the applicable ASTM test methods: ASTM E8 and B557 for tensile testing, E9 for compression testing. E111 for tensile and compressive modulus and ASTM E399 for plane strain fracture toughness. Tensile properties were measured in the L and LT directions. Compressive strength and elastic modulus were measured in the L direction only. The plane strain fracture toughness specimens were in the T-L orientation, had a width W of 2 inches and were of full panel thickness. The fracture specimens were excised from the panel so that their machined slot (representing the expected plane of crack extension) was aligned with the region of interest. Two specimens were taken in the weld and HAZ, one specimen with the machined notch pointed in the same direction as the friction stir welding tool had traveled during the welding operation and one with the machined notch pointed in the opposite direction. The results from these tests are given in Table 5.

TABLE 5

| Property | Dir | Alloy A | | | 2099 | |
| --- | --- | --- | --- | --- | --- | --- |
| | | Base Metal | HAZ | Weld | HAZ | Base Metal |
| UTS (ksi) | L | 84.5 | 56.8 | 61.2 | 77.6 | 83.1 |
| | LT | 84.3 | | 62.4* | | 77.2 |
| TYS (ksi) | L | 79.8 | 43.9 | 59.0 | 69.9 | 76.0 |
| | LT | 79.1 | | 50.3* | | 70.6 |
| CYS (ksi) | L | 82.3 | 69.5 | 60.9 | 76.2 | |
| Et (Mpsi) | L | 10.3 | 10.4 | | 11.5 | 11.5 |
| Ec (Mpsi) | L | 10.7 | 10.7 | 11.3 | 11.8 | 11.9 |
| KIc, Kq (ksi√in) | T-L | 41.5 | 34.2[1], 36.2[2] | 40.5[1], 38.2[2] | 26.4[1], 27.1[2] | 32.1 |

Notes:
*LT tensile specimens traversed both the weld and HAZ failing in the weakest location.
[1]Crack extension in the same direction as that traveled by the welding tool during the welding operation.
[2]Crack extension in the opposite direction to that traveled by the welding tool during the welding operation.

Even with the compromise in aging practices made for each alloy, the base metal of each which received the pre-weld aging practice (different for each alloy) and post-weld aging practice (the same for each alloy) achieved the desired strength and toughness level for the targeted tempers. The properties in the HAZ and weld were lower as is typically observed for welds. The weld region is essentially solution heat treated during the friction stir welding process so the artificial aging of this region occurs only during the post-weld age. Likewise, the HAZ is also heated during the welding process but at a temperature which is below that used for solution heat treating and thus inadequate to fully solutionize the alloying elements. This can limit its aging response in the HAZ during the post-weld age and degrade its strength and fracture toughness. Despite these factors, the weld efficiency (i.e, the ratio of the weld strength to the base metal strength) achieved was quite good. Measured perpendicular to the weld line where the tensile specimen included both the weld and HAZ, the weld efficiency was 71% for tensile yield strength (TYS) and 81% for ultimate tensile strength compared to the base metal strength for 2099 in the LT direction.

The fracture toughness achieved in the weld and HAZ were also satisfactory. In the weld zone the fracture toughness was equivalent to that in the Alloy A base metal, while the fracture toughness in the HAZ on both the Alloy A and 2099 side of the weld were lower than in their respective base metal but still sufficient to meet the requirements of most aircraft structure.

Stress corrosion (SCC) and exfoliation testing were also performed on the joined panels following the post-weld age. For SCC testing, flat tensile-type specimens with a thickness of 0.235 inch were machined at mid-thickness perpendicular to and across the weld and HAZ. Three specimens each were tested at two stress levels, 26 and 35 ksi by alternate immersion in accordance with ASTM G47 and G44. No failures were observed after an exposure period of 250 days. For exfoliation testing, two rectangular specimens of full panel thickness containing the weld, HAZ and base metals were tested using the EXCO test method in accordance with ASTM G34. This test method is an appropriate accelerated test method for 7XXX alloys such as the invention alloy. A second set of specimens of full panel thickness were tested using Dry Bottom MASTMAASIS in accordance with ASTM G85. This test method is an appropriate accelerated test method for 2099. Both the base metal of Alloy A and 2099 had an exfoliation rating of EA. This rating is indicative of good corrosion performance and consistent with the typical performance of the targeted tempers for each alloy. The weld region which contained a mixture of both alloys had a rating of EB by the EXCO test method again indicating reasonably good exfoliation corrosion resistance. Some degradation in corrosion performance of the weld is expected since this region receives only the post-weld age. The HAZ in 2099 had a MASTMAASIS rating of P, however the HAZ in Alloy A exhibited localized attack and had an EXCO rating of ED. This corrosion performance may be unacceptable for internal aircraft structure such as spars and ribs but could likely be improved by optimizing the friction stir welding parameters or using cooling methods during welding in order to reduce heat input into the HAZ. This region could also be protected in service by the use of corrosion protection methods. For example, prior to the application of anodize and an anti-corrosive primer, which are already commonly used for corrosion protection in internal structure, an aluminum alloy more anodic than the invention alloy could be applied along the weld line by thermal spray or other methods. Galvanic corrosion resulting from differences in corrosion potential in Alloy A and 2099 may have contributed to the localized attack in the HAZ of alloy. In this case, the use of leaner and richer alloys of similar composition to the invention alloy which should have less difference in corrosion potential than two very dissimilar alloys, or the use of the invention alloy alone in different tempers may be beneficial for improving corrosion resistance in the HAZ.

While specific embodiments of the invention has been described in detail, it will be appreciated by those skilled in the art that various modifications and alternatives to those details could be developed in light of the overall teachings of the disclosure. Accordingly, the particular arrangements disclosed are meant to be illustrative only and not limiting as to the scope of the invention which is to be given the full breadth of the appended claims and any and all equivalents thereof.

What is claimed is:

1. An aluminum alloy plate product having a thickness of less than about 2.5 inches, the alloy consisting essentially of from 7.64 to 7.7 wt. % Zn, from 1.62 to 1.65 wt. % Mg, from 1.81 to 2.15 wt. % Cu; from 0.05 to 0.3 wt. % Zr, less than 0.1 wt. % Mn, less than 0.05 wt. % Cr, the balance being aluminum, incidental elements and impurities;

wherein the plate realizes a combination of strength and toughness that satisfies the expression $FT \geq 4.0*(TYS) + 453$;

where TYS is the longitudinal tensile yield strength in ksi as measured in accordance with ASTM E8 and ASTM B557; and where FT is the LT plane stress fracture toughness ($K_{app}$) of the plate in ksi√in, where FT is measured in accordance with ASTM Standard E561 and B646 on a center-cracked aluminum alloy specimen taken from the T/2 location of an aluminum alloy plate, where the specimen has a width of 16 inches, a thickness of 0.25 inch and a initial fatigue pre-crack length of 4 inches.

2. The alloy product of claim 1, having an EXCO corrosion resistance rating of "EB" or better.

3. The alloy product of claim 1, wherein the product is an aerospace structural component.

4. The alloy product of claim 1, wherein the alloy product is a fuselage component.

5. The alloy product of claim 1, wherein the alloy product is an armor component.

6. The alloy product of claim 2, wherein the plate realizes a FT of at least about 100 ksi√inch and a TYS of at least about 80 ksi.

7. The alloy product of claim 6, wherein the plate has a thickness of about 1 inch.

* * * * *

UNITED STATES PATENT AND TRADEMARK OFFICE
CERTIFICATE OF CORRECTION

PATENT NO.       : 8,673,209 B2  
APPLICATION NO.  : 11/748021  
DATED            : March 18, 2014  
INVENTOR(S)      : Bray et al.

Page 1 of 1

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 527 days.

Signed and Sealed this
Eleventh Day of August, 2015

Michelle K. Lee
*Director of the United States Patent and Trademark Office*